United States Patent
Maeda et al.

(10) Patent No.: US 10,625,240 B2
(45) Date of Patent: Apr. 21, 2020

(54) MWF-TYPE ZEOLITE

(71) Applicant: ASAHI KASEI KABUSHIKI KAISHA, Tokyo (JP)

(72) Inventors: Saya Maeda, Tokyo (JP); Akitake Nakamura, Tokyo (JP); Takayuki Akaogi, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 253 days.

(21) Appl. No.: 15/764,656

(22) PCT Filed: Jun. 22, 2017

(86) PCT No.: PCT/JP2017/023095
§ 371 (c)(1),
(2) Date: Mar. 29, 2018

(87) PCT Pub. No.: WO2017/222028
PCT Pub. Date: Dec. 28, 2017

(65) Prior Publication Data
US 2018/0280924 A1 Oct. 4, 2018

(30) Foreign Application Priority Data

Jun. 23, 2016 (JP) .................................. 2016-124726
Sep. 29, 2016 (JP) .................................. 2016-191106

(51) Int. Cl.
*B01D 53/04* (2006.01)
*B01J 20/18* (2006.01)
(Continued)

(52) U.S. Cl.
CPC .............. *B01J 20/18* (2013.01); *B01D 53/02* (2013.01); *B01D 53/04* (2013.01); *B01D 53/261* (2013.01);
(Continued)

(58) Field of Classification Search
CPC ...... B01D 53/02; B01D 53/04; B01D 53/261; B01D 53/28; B01D 2253/1085;
(Continued)

(56) References Cited

U.S. PATENT DOCUMENTS 4,247,416 A 1/1981 Doherty et al.
2011/0287261 A1* 11/2011 Yajima .................... C01B 37/02
428/402

(Continued)

FOREIGN PATENT DOCUMENTS

KR 10-1555149 B1 10/2015

OTHER PUBLICATIONS

Guo et al., "A zeolite family with expanding structural complexity and embedded isoreticular structures", Nature, vol. 524, Aug. 6, 2015, 15 pages.
(Continued)

*Primary Examiner* — Frank M Lawrence, Jr.
(74) *Attorney, Agent, or Firm* — Birch, Stewart, Kolasch & Birch, LLP (57) ABSTRACT

An MWF-type zeolite, wherein, when the heights of peaks around 2θ=11.1 and 13.8° in a peak obtained by X-ray diffraction are defined as A and B, respectively, 0.63≤B/A≤0.80 satisfied.

12 Claims, 1 Drawing Sheet (51) Int. Cl.
    *C01B 39/48*     (2006.01)
    *B01J 20/34*     (2006.01)
    *B01D 53/26*     (2006.01)
    *B01D 53/02*     (2006.01)
    *B01D 53/28*     (2006.01)
    *B01J 20/30*     (2006.01)

(52) U.S. Cl.
    CPC .......... *B01D 53/28* (2013.01); *B01J 20/3057* (2013.01); *B01J 20/3078* (2013.01); *B01J 20/3085* (2013.01); *B01J 20/34* (2013.01); *C01B 39/48* (2013.01); *B01D 2253/1085* (2013.01); *B01D 2256/245* (2013.01); *B01D 2257/504* (2013.01); *B01D 2257/80* (2013.01)

(58) Field of Classification Search
    CPC ........ B01D 2253/108; B01D 2256/245; B01D 227/80; B01D 227/504; B01J 20/18; B01J 20/3057; B01J 20/3078; B01J 20/3085; B01J 20/34; C01B 39/48
    USPC ............. 95/139, 900; 96/108; 423/700, 701, 423/717; 502/60, 77
    See application file for complete search history.

(56) References Cited

U.S. PATENT DOCUMENTS

2014/0157986 A1*   6/2014   Ravikovitch .......... B01D 53/04
    95/96
2014/0360938 A1*   12/2014   Hayashi .................. C01B 39/48
    210/638
2015/0010704 A1*   1/2015   Hagio .................. B01D 53/228
    427/245

OTHER PUBLICATIONS

International Search Report (PCT/ISA/210) issued in PCT/JP2017/023095, dated Aug. 15, 2017.
Min et al., "Zeolites ZSM-25 and PST-20: Selective Carbon Dioxide Adsorbents at High Pressures", The Journal of Physical Chemistry C, vol. 121, Dec. 4, 2017, pp. 3404-3409.
Written Opinion (PCT/ISA/237) issued in PCT/JP2017/023095, dated Aug. 15, 2017.

* cited by examiner

MWF-TYPE ZEOLITE

TECHNICAL FIELD

The present invention relates to an MWF-type zeolite, a method for producing an MWF-type zeolite, a method for separating gas and a method for regenerating an MWF-type zeolite.

BACKGROUND ART

Zeolite can be used for adsorbents, desiccants, separating agents, catalysts, catalyst carriers, detergent aids, ion exchangers, waste water treatment agents, fertilizers, food additives, cosmetic additives and the like, and, in particular, is useful in gas separation applications.

An MWF-type zeolite means a zeolite having an MWF structure in codes for directing zeolite structures specified by the International Zeolite Association (IZA). Patent Literature 1 discloses ZSM-25 which is one MWF-type zeolite. In recent years, the structure of ZSM-25 which is one MWF-type zeolite has been revealed as described in Patent Literature 2 and Non-Patent Literature 1. It has been reported that the structure has an Im3m space group of a regular hexahedron crystal system and ZSM-25 is a zeolite having a pore constituted by an oxygen 8-membered ring. In addition, it has been reported that ZSM-25 selectively adsorbs carbon dioxide and thus is used for separation of carbon dioxide and methane and/or separation of carbon dioxide and nitrogen.

CITATION LIST

Patent Literatures

Patent Literature 1: U.S. Pat. No. 4,247,416
Patent Literature 2: Korean Patent No. 101555149

Non-Patent Literatures

Non Patent Literature 1: Peng Guo, Jiho Shin, Alex G. Greenaway, Jung Gi Min, Jie Su, Hyun June Choi, Leifeng Liu, Paul A. Cox, Suk Bong Hong, Paul A. Wright, Xiaodong Zou. "A zeolite family with expanding structural complexity and embedded isoreticular structures" Nature. 2015, 524, 74-78.

SUMMARY OF INVENTION

Technical Problem

With respect to a natural gas refinery plant, development of a low-quality gas field has been advanced in response to an increase in demand, and there has been desired separation of carbon dioxide and methane from the gas containing high-concentration carbon dioxide. Additionally, in recent years, a decrease in the amount of exhaust gas from naphtha has resulted in a decrease in the amount of liquefied carbon dioxide to be produced from a high-concentration carbon dioxide exhaust gas, and thus there has been required a carbon dioxide refinement technique higher in selectivity.

The MWF-type zeolites disclosed in Patent Literature 1, Patent Literature 2, Non-Patent Literature 1 and the like, however, are not sufficient in the gas separation ability for high requirements as described above.

The present invention has been made in view of the above circumstances, and an object thereof is to provide an MWF-type zeolite which has few crystal lattice distortions and defects, in which a crystalline fine structure is clearly formed, and which is high in selectivity of adsorption of carbon dioxide ($CO_2$) relative to the amount of adsorption of methane ($CH_4$).

Solution to Problem

The present inventors have made intensive studies in order to solve the above problems, and as a result, have found that the problems of the present application can be solved when the intensity ratio of specific diffraction peaks in a diffraction pattern obtained by subjecting an MWF-type zeolite to X-ray diffraction measurement is within a predetermined range, leading to completion of the present invention.

That is, the present invention is as follows.

[1]
An MWF-type zeolite, wherein, when heights of peaks around $2\theta=11.1$ and $13.8°$ in a peak obtained by X-ray diffraction are defined as A and B, respectively, $0.63 \leq B/A \leq 0.80$ is satisfied.

[2]
The MWF-type zeolite according to [1], wherein, when a height of a peak around $2\theta=51.6°$ in the peak obtained by X-ray diffraction is defined as C, $0.36 \leq C/A \leq 0.52$ is satisfied.

[3]
The MWF-type zeolite according to [1] or [2], wherein a half-value width of a peak around $2\theta=11.1°$ in the peak obtained by X-ray diffraction satisfies 0.31 or less.

[4]
An MWF-type zeolite, wherein, when:
an amount of saturation adsorption of carbon dioxide into the MWF-type zeolite, measured when the MWF-type zeolite and carbon dioxide are placed in a system at 25° C. and 760 mmHg, is defined as a ($cm^3/g$), and
an amount of saturation adsorption of methane into the MWF-type zeolite, measured when the MWF-type zeolite and methane are placed in a system at 25° C. and 760 mmHg, is defined as b ($cm^3/g$);
a value obtained by dividing a by b is 23 or more.

[5]
An MWF-type zeolite, wherein
an amount of saturation adsorption of carbon dioxide into the MWF-type zeolite, measured when the MWF-type zeolite and carbon dioxide are placed in a system at 25° C. and 760 mmHg, is 10 $cm^3/g$ or more, and
an amount of saturation adsorption of methane into the MWF-type zeolite, measured when the MWF-type zeolite and methane are placed in a system at 25° C. and 760 mmHg, is 3.5 $cm^3/g$ or less.

[6]
A method for producing the MWF-type zeolite according to any of [1] to [5], comprising:
a step of preparing a mixed gel comprising:
a silica source comprising silicon;
an aluminum source comprising aluminum;
an alkali metal source comprising at least one selected from an alkali metal (M1) and an alkali earth metal (M2); and
water,
wherein, when molar ratios of respective components in the mixed gel are calculated, molar ratios $\alpha$, $\beta$, $\gamma$ and $\delta$ represented by the following expressions (1), (2), (3) and (4) satisfy $5.0 \leq \alpha \leq 12$, $1.3 \leq \beta \leq 3.2$, $100 \leq \gamma \leq 3000$ and $0.10 \leq \delta \leq 0.60$:

$$\alpha = SiO_2/Al_2O_3 \quad (1)$$

$$\beta=(M1_2O+M2O)/Al_2O_3 \quad (2)$$

$$\gamma=H_2O/Al_2O_3 \quad (3)$$

$$\delta=OH^-/SiO_2 \quad (4),$$

wherein, with respect to the silicon, the aluminum, the alkali metal (M1) and the alkali earth metal (M2), the molar ratios are calculated in terms of oxides of corresponding elements.

[7]

The method for producing the MWF-type zeolite according to [6], wherein the mixed gel further comprises an organic structure-directing agent R, and a molar ratio ε represented by the following expression (5) satisfies 2.00≤249≤50:

$$\varepsilon=R/Al_2O_3 \quad (5).$$

[8]

The method for producing the MWF-type zeolite according to [6] or [7], further comprising a hydrothermal synthesis step where a hydrothermal synthesis temperature is 100° C. to 170° C.

[9]

The method for producing the MWF-type zeolite according to any of [6] to [8], further comprising a calcining step in which a calcining temperature is 300° C. or more and less than 550° C.

[10]

A method for separating gas comprising:

a step of contacting the MWF-type zeolite according to any of [1] to [5] with a gas mixture comprising a plurality of gas components, to adsorb into the MWF-type zeolite a gas component larger in an amount of adsorption into the MWF-type zeolite, thereby separating the gas component from the gas mixture.

[11]

The method for separating gas according to [10], wherein the gas mixture comprises at least two gas components selected from the group consisting of carbon dioxide, hydrogen, oxygen, nitrogen, methane, ethane, ethylene, propane, propylene, n-butane, isobutane, 1-butene, 2-butene, isobutene, sulfur hexafluoride, helium, carbon monoxide, nitrogen monoxide and water.

[12]

A method for regenerating the MWF-type zeolite, comprising:

a step in which the gas component adsorbed into the MWF-type zeolite by the method for separating gas according to [10] or [11] is desorbed to thereby regenerate the MWF-type zeolite.

Advantageous Effect of Invention

The present invention can provide an MWF-type zeolite which has few crystal lattice distortions and defects, in which a crystalline fine structure is clearly formed, and which is high in selectivity of adsorption of carbon dioxide ($CO_2$) relative to the amount of adsorption of methane ($CH_4$).

DESCRIPTION OF EMBODIMENTS

Hereinafter, an embodiment for carrying out the present invention (hereinafter, referred to as "the present embodiment".) will be described in detail. The present invention is not limited to the following description, and can be variously modified and carried out within the gist thereof.

[X-Ray Diffraction Peak]

In an MWF-type zeolite of the present embodiment, when the heights of peaks around 2θ=11.1 and 13.8° in a peak obtained by X-ray diffraction are defined as A and B, respectively, 0.61≤B/A≤0.83 is satisfied.

Herein, the X-ray diffraction pattern refers to the one obtained by irradiating a surface, where the zeolite is uniformly secured on a non-reflective sample plate for powder, with X-ray whose radiation source is CuKα, with a scanning axis of θ/2θ.

The peak around 2θ=11.1° refers to the maximum peak present in the range of 11.1°±0.1°.

The peak around 2θ=13.8° refers to the maximum peak present in the range of 13.8°±0.2°.

Peaks around 2θ=11.1 and 13.8° in an X-ray diffraction peak at 25° C. of the MWF-type zeolite of the present embodiment correspond to diffraction peaks of (4 4 0) and (5 5 0), respectively. That is, these are from diffraction of respective parallel crystal lattice planes, and it is indicated that, when the heights of diffraction peaks of (4 4 0) and (5 5 0) are defined as A and B, respectively, and B/A is high, a finer structure is clear. That is, it is considered that there are few deficiencies in a Si—O or Al—O bond, the bond distance and angle uniformities are high, and defects through which $CH_4$ may penetrate into the crystal lattice and deficiencies at an adsorption site of $CO_2$ hardly occur, thereby enabling the ratio of the amounts of adsorption, $CO_2/CH_4$, to be maximized. From these viewpoints, B/A is 0.63 or more, preferably 0.635 or more, more preferably 0.64 or more.

On the other hand, it is considered that a higher value of the peak height A indicates that a higher-order structure such as an 8-membered ring structure is clear, namely, a fine structure is regularly aligned and a pore is properly formed. It is considered that a pore structure is properly formed without any deficiencies and thus has the molecular sieve effect of the MWF-type zeolite on gas molecules different in size from each other, and $CO_2$ can enter the pore, but $CH_4$ hardly enters the pore, thereby the ratio of the amounts of adsorption, $CO_2/CH_4$, to be maximized. From these viewpoints, it is important that the height A is also high, and B/A is 0.80 or less, preferably 0.79 or less, more preferably 0.78 or less.

In other words, the range of B/A is in the range from 0.63 to 0.80 from the viewpoints that a fine structure is clear, there are few deficiencies in a Si—O or Al—O bond, deficiencies hardly occur at a gas adsorption site, and a higher-order structure is clear and a pore is properly formed to allow the molecular sieve effect of the MWF-type zeolite to be exerted.

A peak around 2θ=51.6° corresponds to a diffraction peak of (18 18 0), and when the height of this peak is defined as C, C/A is preferably 0.36 or more, more preferably 0.37 or more, further preferably 0.38 or more, from the viewpoint of the following: while B/A is high in the SN ratio and easily allows for comparison of the height ratio, C of C/A is obtained by wide-angle reflection and is high in measurement accuracy of the peak by itself with corresponding to the change in crystal lattice, and therefore both of B/A and C/A are within proper ranges to result in an increase in $CO_2/CH_4$ selectivity and also a more increase in the accuracy by use of C/A, resulting in a further increase in the ratio of the amounts of adsorption, $CO_2/CH_4$.

Also with respect to a relationship between the heights of peaks C and A, C/A is preferably 0.52 or less, more preferably 0.50 or less, further preferably 0.48 or less, from the same viewpoints as described above.

The peak around $2\theta=51.6°$ here refers to the maximum peak present in the range of $51.6°\pm0.4°$.

Additionally, a peak around $2\theta=12.7°$ corresponds to a diffraction peak of (5 4 1), and is from diffraction having a reciprocal lattice vector in each of three crystal axis directions. Accordingly, when the height of this peak is defined as D, D is sensitive to the distortion in each of the three crystal axis directions. On the other hand, A reflects the number of long-period structures such as 8-membered ring structures, and crystallinity, therefore D/A represents the crystal lattice distortion in each of the three directions, to long-period structures such as 8-membered ring structures, and it can be said that a higher D/A value means less crystal lattice distortion and more isotropy. Since less potential crystal lattice distortion allows a pore space to be more retained, a certain or higher D/A value is obtained, to result in a tendency to allow a small gas molecule, which can enter a pore, to easily enter and leave a pore, and thus, in the case of separation with adsorption of gas into a zeolite pore, a molecule adsorbed is desorbed for suitable regeneration and use. A preferable D/A is 0.75 or more, more preferably 0.78 or more, further preferably 0.80 or more.

The peak around $2\theta=12.7°$ here refers to the maximum peak present in the range of $12.7°\pm0.2°$.

Herein, the B/A and C/A values can be determined by a method described in Examples below, and both can be adjusted within the above ranges by methods for adjusting the compositional ratio, conditions in hydrothermal synthesis (heating temperature and heating time), and the like of a mixed-gel within preferable ranges described below.

The peak half-value width obtained by X-ray diffraction represents crystallinity of a crystal lattice plane on which the diffraction occurs, and is preferably narrow. In particular, a peak around $2\theta=11.1°$ indicates a higher-order structure such as an 8-membered ring structure and represents proper pore formation, thereby affecting the molecular sieve effect by shielding of a large gas molecule in the pore of the MWF-type zeolite, and thus the half-value width of the peak is particularly importantly narrow. The range of the peak half-value width around $2\theta=11.1°$ is preferably 0.31 deg or less, more preferably 0.28 deg or less, further preferably 0.25 deg or less. The present inventors have thus presumed that the structure of the MWF-type zeolite indicated by such a peak half-value width enables $CH_4$ not to penetrate into the crystal lattice and thus to be adsorbed in a decreased amount, and also enables deficiencies at an adsorption site of $CO_2$ not to occur, to thereby maximize the amount of adsorption of $CO_2$, thereby maximizing the ratio of the amounts of adsorption, $CO_2/CH_4$.

Herein, the peak half-value width value can be adjusted within the above range by methods for adjusting the compositional ratio, conditions in hydrothermal synthesis (heating temperature and heating time), and the like of a mixed-gel within preferable ranges described below.

[Amount of Saturation Adsorption of Gas]

The MWF-type zeolite of the present embodiment can also be identified as follows. That is, when the amount of saturation adsorption of carbon dioxide into the MWF-type zeolite, measured when the MWF-type zeolite and carbon dioxide are placed in a system at 25° C. and 760 mmHg, is defined as a ($cm^3/g$), and the amount of saturation adsorption of methane into the MWF-type zeolite, measured when the MWF-type zeolite and methane are placed in a system at 25° C. and 760 mmHg, is defined as b ($cm^3/g$), the value (a/b) obtained by dividing a by b is 23 or more.

Alternatively, the MWF-type zeolite of the present embodiment can also be identified as follows. That is, the amount a of saturation adsorption of carbon dioxide into the MWF-type zeolite, measured when the MWF-type zeolite and carbon dioxide are placed in a system at 25° C. and 760 mmHg, is 10 $cm^3/g$ or more at 25° C. and 760 mmHg, and the amount b of saturation adsorption of methane into the MWF-type zeolite, measured when the MWF-type zeolite and methane are placed in a system at 25° C. and 760 mmHg, is 3.5 $cm^3/g$ or less.

The MWF-type zeolite of the present embodiment, as indicated by such characteristics, is high in purity and high in selectivity of adsorption of carbon dioxide ($CO_2$). That is, the MWF-type zeolite of the present embodiment can be said to be high in the adsorption ability of carbon dioxide ($CO_2$), low in the adsorption ability of methane, and high in the ratio of the amount of saturation adsorption of carbon dioxide ($CO_2$) to the amount of saturation adsorption of methane ($CH_4$). Thus, the MWF-type zeolite of the present embodiment is high in the purity thereof and high in the selectivity of adsorption of carbon dioxide ($CO_2$), and therefore can separate a gas component large in and a gas component small in the amount of adsorption into the MWF-type zeolite. That is, the MWF-type zeolite can be suitably used in an application where gas separation is made by means of such a difference in adsorption ability.

The respective amounts of saturation adsorption can be measured by a method described in Examples below. The a/b value can be adjusted within the above ranges by, for example, production of the MWF-type zeolite by a method for producing the MWF-type zeolite, described below. More specifically, the following factors are presumed: the component/composition, the hydrothermal synthesis temperature, the calcining temperature and the like of a mixed gel, described below, are optimized, thereby properly forming a crystal of an MWF-type backbone, decreasing defects in the crystal, suppressing formation of a zeolite having a backbone different from the MWF-type backbone, keeping the MWF-type backbone in calcining, and the like; resulting in a tendency to increase the a/b value. Herein, the mechanism is not limited to the above. Meanwhile, if the composition of a mixed gel is changed from a preferable range described below and/or the reaction temperature is higher, and the like, to thereby cause a zeolite having a backbone different from the MWF-type backbone to be formed in a large amount, the selectivity tends to be deteriorated.

Furthermore, the respective amounts a and b of saturation adsorption can also be adjusted within the above respective ranges by, for example, production of the MWF-type zeolite based on a method for producing the MWF-type zeolite, described below. More specifically, when a zeolite having a larger pore size than and having a backbone different from the MWF-type backbone is formed, both of the amount of saturation adsorption of $CO_2$ and the amount of saturation adsorption of $CH_4$ tend to be increased. In addition, when a pore is occluded and the like, both of the amount of saturation adsorption of $CO_2$ and the amount of saturation adsorption of $CH_4$ tend to be decreased.

[Synthesis Method]

A method for producing an MWF-type zeolite according to the present embodiment includes a step of preparing a mixed gel containing: a silica source including silicon; an aluminum source including aluminum; an alkali metal source including at least one selected from an alkali metal (M1) and an alkali earth metal (M2); and water.

Hereinafter, the mixed gel and each component included therein will be described.

[Step of Preparing Mixed Gel]

The step of preparing a mixed gel is not particularly limited, and examples of such step may include a mixing step of mixing a silica source, an aluminum source, an alkali metal source, water, and, if necessary, an organic structure-directing agent at one time or at multiple stages, and an aging step of the mixture obtained in the mixing step.

The mixing step can mix components including the silica source, the aluminum source, the alkali metal source, water, and, if necessary, the organic structure-directing agent at one time or at multiple stages.

The order in mixing at multiple stages is not limited, and may be appropriately selected depending on conditions used. The mixing at multiple stages may be performed either with stirring or without stirring, and it is preferable from the viewpoint of making a precursor for formation of a gis structure which is a constituent element of the MWF-type zeolite and which is considered not to contain any organic structure-directing agent that a mixed liquid including the alkali metal source, the aluminum source and the silica source be used and a stirring step and an aging step be included. When the aluminum source and the silica source are mixed and aged, a low temperature is preferably adopted from the viewpoint of suppressing an excessive condensation reaction of Al and Si to simultaneously realize precursor formation and uniform mixing. Specifically, the temperatures in the mixing, stirring, and aging steps are each preferably 15° C. or less. The periods for the mixing, stirring, and aging steps are each preferably 10 minutes or more and 24 hours or less, further preferably 20 minutes or more and 12 hours or less, most preferably 30 minutes or more and 8 hours or less, from the viewpoint of enabling an excessive condensation reaction to be prevented for sufficiently uniform mixing.

From the viewpoint of forming the precursor of a gis structure serving as the internal structure of the MWF-type zeolite, then surrounding it, and forming the precursors of lta and pau structures, containing the organic structure-directing agent, to promote backbone formation of the MWF-type zeolite, preferably, the alkali metal source, the aluminum source and the silica source are first mixed and the organic structure-directing agent is added to a mixed liquid including such sources. The temperatures and the periods for the mixing, stirring, and aging steps of a mixed gel where the alkali metal source, the aluminum source and the silica source are mixed with the organic structure-directing agent are preferably 15° C. or less, and 10 minutes or more and 24 hours or less, further preferably 12° C. or less, and 20 minutes or more and 12 hours or less, most preferably 10° C. or less, and 45 minutes or more and 8 hours or less, respectively, from the viewpoint of enabling an excessive condensation reaction to be prevented for sufficiently uniform mixing. From the foregoing, it is presumed that a fine structure and a long-period structure are properly formed and highly crystallized, thereby optimizing B/A and the half-value width, to impart high $CO_2$ selectivity.

In stirring, a stirring method commonly used is adopted without any particular limitation, and specific examples thereof include methods using blade stirring, vibration stirring, oscillation stirring, and centrifugation stirring, and the like.

The rotational speed in stirring is not particularly limited as long as it is a stirring speed commonly used, and is, for example, 1 rpm or more and less than 2000 rpm.

The period for the mixing step is not particularly limited and can be appropriately selected depending on the temperature in the mixing step, and is, for example, more than 0 minutes and 1000 hours or less. The speed of addition of starting materials in the mixing step is preferably higher for a high production efficiency from the viewpoint of excellent economic efficiency. On the other hand, the speed of addition is preferably low from the viewpoint of suppressing an excessive condensation reaction of Al and Si to simultaneously realize precursor formation and uniform mixing. From such viewpoints, when about 100 cc of the mixed gel is prepared, the speed is preferably 0.1 cc/min or more and 100 cc/min or less, further preferably 0.2 cc/min or more and 50 cc/min or less, most preferably 0.5 cc/min or more and 10 cc/min or less.

The aging step may be performed with either standing or stirring.

In stirring in the aging step, a stirring method commonly used is adopted without any particular limitation, and specific examples thereof include methods using blade stirring, vibration stirring, oscillation stirring, and centrifugation stirring.

The rotational speed in stirring is not particularly limited as long as it is a stirring speed commonly used, and is, for example, 1 rpm or more and less than 200 rpm.

[Mixed Gel]

The mixed gel in the present embodiment is a mixture including a silica source, an aluminum source, an alkali metal source and water as essential components and preferably including an organic structure-directing agent.

The silica source refers to a component in the mixed gel, serving as a starting material of silicon included in a zeolite produced from the mixed gel, the aluminum source refers to a component in the mixed gel, serving as a starting material of aluminum included in a zeolite produced from the mixed gel, and the alkali metal source refers to a component in the mixed gel, serving as starting material(s) of an alkali metal and/or an alkali earth metal included in a zeolite produced from the mixed gel.

[Silica Source]

The silica source is not particularly limited as long as it is one commonly used, and specific examples thereof include amorphous silica, colloidal silica, wet method silica, dry method silica, silica gel, sodium silicate, amorphous aluminosilicate gel, tetraethoxysilane (TEOS) and trimethylethoxysilane. These compounds may be used singly or in combinations of a plurality thereof. Here, amorphous aluminosilicate gel serves as the silica source and also serves as the aluminum source.

Among them, amorphous silica, colloidal silica, wet method silica, dry method silica or silica gel is preferable from the viewpoint that a zeolite high in the degree of crystallinity tends to be obtained. From the same viewpoint, colloidal silica, wet method silica or dry method silica is more preferable.

Examples of the colloidal silica include, but not limited to the following, Ludox (registered trademark), Syton (registered trademark), Nalco (registered trademark) and Snowtex (registered trademark).

Examples of the wet method silica include, but not limited to the following, Hi-Sil (registered trademark), Ultrasil (registered trademark), Vulcasil (registered trademark), Santocel (registered trademark), Valron-Estersil (registered trademark), Tokusil (registered trademark), Zeosil (registered trademark), Carplex (registered trademark), Mizukasil (registered trademark), Sylysia (registered trademark), Syloid (registered trademark), Gasil (registered trademark), Silcron (registered trademark), Nipgel (registered trademark) and Nipsil (registered trademark).

Examples of the dry method silica include HDK (registered trademark), Aerosil (registered trademark), Reolosil (registered trademark), Cab-O-Sil (registered trademark), Fransil (registered trademark) and ArcSilica (registered trademark).

[Aluminum Source]

The aluminum source is not particularly limited as long as it is one commonly used, and specific examples thereof include, sodium aluminate, aluminum sulfate, aluminum nitrate, aluminum acetate, aluminum hydroxide, aluminum oxide, aluminum chloride, aluminum alkoxide, metallic aluminum and amorphous aluminosilicate gel. These compounds may be used singly or in combinations of a plurality thereof.

Among them, sodium aluminate, aluminum sulfate, aluminum nitrate, aluminum acetate, aluminum hydroxide, aluminum chloride or aluminum alkoxide is preferable from the viewpoint that a zeolite high in the degree of crystallinity tends to be obtained. From the same viewpoint, sodium aluminate or aluminum hydroxide is more preferable, and sodium aluminate is further preferable.

[Alkali Metal Source]

The alkali type in the alkali metal source is not particularly limited, and any alkali metal and/or any alkali earth metal compound can be used.

Examples of the alkali metal source include, but not limited to the following, hydroxide, hydrogen carbonate, carbonate, acetate, sulfate and nitrate of an alkali metal or an alkali earth metal. These compounds may be used singly or in combinations of a plurality thereof.

The alkali metal and the alkali earth metal for use in the alkali metal source can be usually Li, Na, K, Rb, Cs, Ca, Mg, Sr, Ba or the like. Na or K is preferable and Na is more preferable, from the viewpoint of more facilitating crystal formation of the MWF-type backbone. The alkali metal and the alkali earth metal for use in the alkali metal source may be used singly or in combinations of a plurality thereof.

Specific examples of the alkali metal source include, but not limited to the following, sodium hydroxide, sodium acetate, sodium sulfate, sodium nitrate, sodium carbonate, sodium hydrogen carbonate, potassium hydroxide, potassium acetate, potassium sulfate, potassium nitrate, potassium carbonate, potassium hydrogen carbonate, lithium hydroxide, lithium acetate, lithium sulfate, lithium nitrate, lithium carbonate, lithium hydrogen carbonate, rubidium hydroxide, rubidium acetate, rubidium sulfate, rubidium nitrate, rubidium carbonate, rubidium hydrogen carbonate, cesium hydroxide, cesium acetate, cesium sulfate, cesium nitrate, cesium carbonate, cesium hydrogen carbonate, calcium hydroxide, calcium acetate, calcium sulfate, calcium nitrate, calcium carbonate, calcium hydrogen carbonate, magnesium hydroxide, magnesium acetate, magnesium sulfate, magnesium nitrate, magnesium carbonate, magnesium hydrogen carbonate, strontium hydroxide, strontium acetate, strontium sulfate, strontium nitrate, strontium carbonate, strontium hydrogen carbonate, barium hydroxide, barium acetate, barium sulfate, barium nitrate, barium carbonate and barium hydrogen carbonate.

Among them, sodium hydroxide, potassium hydroxide, lithium hydroxide, rubidium hydroxide, cesium hydroxide, calcium hydroxide, magnesium hydroxide, strontium hydroxide or barium hydroxide is preferable, sodium hydroxide, potassium hydroxide, lithium hydroxide, rubidium hydroxide or cesium hydroxide is more preferable, and sodium hydroxide is further preferable.

[Organic Structure-Directing Agent]

The organic structure-directing agent in the case of zeolite production by hydrothermal synthesis of the mixed gel is a compound acting as promoting crystallization to a zeolite structure. In zeolite crystallization, the organic structure-directing agent can be, if necessary, used. A mixed gel including the organic structure-directing agent is preferably used for synthesis from the viewpoint of more facilitating crystal formation of the MWF-type backbone and/or decreasing the synthesis period to allow economic efficiency in zeolite production to be excellent.

Any organic structure-directing agent may be adopted as the organic structure-directing agent without any limitation in terms of the type as long as it can form a desired MWF-type zeolite. The organic structure-directing agent may be used singly or in combinations of a plurality thereof.

Examples of the organic structure-directing agent which may be used herein include, but not limited to the following, amines, quaternary ammonium salts, alcohols, ethers, amides, alkyl ureas, alkyl thioureas, cyanoalkanes, and alicyclic heterocyclic compounds including nitrogen as a hetero atom, and a quaternary ammonium salt is preferably used, a tetraalkyl ammonium salt is more preferably used and a tetraethyl ammonium salt is further preferably used.

Such salts have an anion. Representative examples of such an anion include, but not limited to the following, a halogen ion such as $Cl^-$, $Br^-$ and $I^-$, a hydroxide ion, an acetate ion, a sulfate ion, a nitrate ion, a carbonate ion, and a hydrogen carbonate ion. Among them, a halogen ion or a hydroxide ion is preferable and a halogen ion is more preferable, from the viewpoint of more facilitating crystal formation of the MWF-type backbone.

[Compositional Ratio of Mixed-Gel]

The ratio between the silica source and $OH^-$ in the mixed gel is represented by the molar ratio of $OH^-$ to $SiO_2$, namely, $OH^-/SiO_2$ ($OH^-$ represents a hydroxide ion included in the alkali metal source and/or the organic structure-directing agent). The MWF-type zeolite of the present embodiment is desirably synthesized by controlling the conditions of synthesis of a precursor oligomer.

An 8-membered ring structure is formed without any deficiencies, thereby exerting the molecular sieve effect to decrease the amount of adsorption of $CH_4$. In order to allow the intensity ratio of a peak A derived from a higher-order structure such as an 8-membered ring structure to be high, namely, to clearly form an 8-membered ring structure, a gis structure or the like and the precursor thereof are preferably built up without breakage, to form a higher-order structure. From these viewpoints, re-dissolution of a zeolite grown is preferably prevented, and less $OH^-$ is preferably present in order to suppress dissolution.

On the other hand, when deficiencies or distortions are present in a 8-membered ring, or a fine structure constituting the backbone, namely, in a Si—O or Al—O bond, the adsorption site of $CO_2$ can be decreased to result in a decrease in the amount of adsorption of $CO_2$. When such a fine structure is formed without any deficiencies and distortions, the heights of peaks B and C derived from a finer structure in parallel with the plane attributing to peak A are relatively increased. In order not to cause any deficiencies and bond distortions of Si—O or Al—O, the silica source and the aluminum source serving as the starting materials are preferably more dissolved, and much $OH^-$ is preferably present in order to more dissolve these sources.

Accordingly, an MWF-type zeolite where the amount of adsorption of $CO_2$ is large and at the same time the amount of adsorption of $CH_4$ is small is obtained only in the case where B/A and C/A are within specific ranges. The present inventors have made intensive studies, and as a result, found that the amount of OH⁻ present in a synthesis liquid, relative to $SiO_2$, can satisfy $0.10 \leq OH^-/SiO_2 \leq 0.60$, thereby synthesizing an MWF-type zeolite, where B/A and C/A can be within specific ranges, without causing any deficiencies and bond distortions of Si—O or Al—O.

The $OH^-/SiO_2$ is more preferably 0.15 or more, further preferably 0.18 or more, in the above range.

The ratio $OH^-/SiO_2$ is more preferably less than 0.40, further preferably 0.35 or less, in the above range.

The ratio between the silica source and the aluminum source in the mixed gel is represented as the molar ratio of the oxides of the corresponding elements, namely, $SiO_2/Al_2O_3$.

The ratio $SiO_2/Al_2O_3$ is not particularly limited as long as zeolite can be formed, and the ratio is preferably 5.0 or more, more preferably 6.0 or more, from the viewpoint that formation of a zeolite having a backbone different from the MWF-type backbone can be suppressed. From the same viewpoint, the ratio is further preferably 6.8 or more.

The $SiO_2/Al_2O_3$ is preferably 12 or less, more preferably 10 or less, from the viewpoint that formation of a zeolite having a backbone different from the MWF-type backbone can be suppressed. From the same viewpoint, the ratio is further preferably 7.8 or less.

The ratio between the aluminum source and the alkali metal source in the mixed gel is represented by the molar ratio of the sum of $M1_2O$ and M2O to $Al_2O_3$, namely, $(M1_2O+M2O)/Al_2O_3$ (wherein M1 represents the alkali metal and M2 represents the alkali earth metal). Herein, the ratio $(M1_2O+M2O)/Al_2O_3$ is preferably 1.3 or more, more preferably 1.5 or more, from the viewpoint of more facilitating crystal formation of the MWF-type backbone. From the same viewpoint, the ratio is further preferably 1.7 or more.

The ratio $(M1_2O+M2O)/Al_2O_3$ is preferably 3.2 or less, more preferably 2.5 or less, from the viewpoint that formation of a zeolite having a backbone different from the MWF-type backbone can be suppressed. From the same viewpoint, 2.2 or less is further preferable.

When the organic structure-directing agent is included in the mixed gel, the ratio between the aluminum source and the organic structure-directing agent in the mixed gel is represented by the molar ratio of the organic structure-directing agent to $Al_2O_3$, namely, $R/Al_2O_3$ (wherein R represents the organic structure-directing agent). The ratio is preferably 2.0 or more, more preferably 3.0 or more, from the viewpoint of more facilitating crystal formation of the MWF-type backbone and/or decreasing the synthesis period to allow economic efficiency in zeolite production to be excellent. The ratio is further preferably 4.0 or more from the viewpoint that formation of a zeolite having a backbone different from the MWF-type backbone can be suppressed.

The ratio $R/Al_2O_3$ is preferably 50 or less, more preferably 30 or less, from the viewpoint of decreasing the synthesis period to allow economic efficiency in zeolite production to be excellent. The ratio is further preferably 20 or less from the viewpoint that formation of a zeolite having a backbone different from the MWF-type backbone can be suppressed.

The ratio between the aluminum source and water in the mixed gel is represented by the molar ratio of water to $Al_2O_3$, namely, $H_2O/Al_2O_3$. The ratio is preferably 100 or more, more preferably 200 or more, from the viewpoint that the components in the mixed gel tend to be more uniformly dispersed. The ratio is further preferably 300 or more from the viewpoint that formation of a zeolite having a backbone different from the MWF-type backbone can be suppressed.

The ratio $H_2O/Al_2O_3$ is preferably 3000 or less, more preferably 1000 or less, from the viewpoint of decreasing the synthesis period to allow economic efficiency in zeolite production to be excellent. The ratio is further preferably 500 or less from the viewpoint that formation of a zeolite having a backbone different from the MWF-type backbone can be suppressed.

As described above, particularly preferably, the method for producing an MWF-type zeolite according to the present embodiment includes a step of preparing a mixed gel containing a silica source including silicon, an aluminum source including aluminum, an alkali metal source including at least one selected from an alkali metal (M1) and an alkali earth metal (M2), and water, wherein, when the molar ratios of components in the mixed gel are calculated (the molar ratios are calculated in terms of oxides of corresponding elements with respect to the silicon, the aluminum, the alkali metal (M1) and the alkali earth metal (M2)), the molar ratios α, β, γ and δ represented by the following expressions (1), (2), (3) and (4) satisfy $5.0 \leq \alpha \leq 12$, $1.3 \leq \beta \leq 3.2$, $100 \leq \gamma \leq 3000$ and $0.10 \leq \delta \leq 0.60$. The MWF-type zeolite according to the present embodiment is particularly preferably one obtained by the method for producing an MWF-type zeolite according to the present embodiment.

$$\alpha = SiO_2/Al_2O_3 \tag{1}$$

$$\beta = (M1_2O+M2O)/Al_2O_3 \tag{2}$$

$$\gamma = H_2O/Al_2O_3 \tag{3}$$

$$\delta = OH^-/SiO_2 \tag{4}$$

Furthermore, in the method for producing an MWF-type zeolite according to the present embodiment, furthermore preferably, the molar ratios α, β, γ and δ satisfy the above ranges and the mixed gel further includes an organic structure-directing agent R, and the molar ratio ε represented by the following expression (5) satisfies $2.0 \leq \varepsilon \leq 50$.

$$\varepsilon = R/Al_2O_3 \tag{5}$$

Although a seed crystal is not necessarily needed to be present in the mixed gel, an MWF-type zeolite produced in advance can also be added as a seed crystal to the mixed gel, to provide the MWF-type zeolite of the present embodiment.

[Hydrothermal Synthesis Step]

The method for producing an MWF-type zeolite according to the present embodiment preferably further includes a hydrothermal synthesis step where the hydrothermal synthesis temperature is 100° C. to 170° C. That is, the mixed gel obtained in the preparation step is preferably subjected to hydrothermal synthesis with being kept at a predetermined temperature for a predetermined period with stirring or standing.

The temperature in the hydrothermal synthesis is not particularly limited as long as it is a temperature commonly used, and it is preferably 100° C. or more, from the viewpoint of decreasing the synthesis period to allow economic efficiency in zeolite production to be excellent. The temperature is more preferably 110° C. or more, further preferably 115° C. or more, from the viewpoint that formation of a zeolite having a backbone different from the MWF-type backbone can be suppressed.

The temperature is preferably 170° C. or less because decomposition of the organic structure-directing agent tends to be able to be suppressed. The temperature is more preferably 155° C. or less, further preferably 145° C. or less, from the viewpoint that formation of a zeolite having a backbone different from the MWF-type backbone can be suppressed.

The temperature in the hydrothermal synthesis may be constant or may be changed stepwisely.

The period for the hydrothermal synthesis is not particularly limited as long as it is a period commonly used, and can be appropriately selected depending on the temperature in the hydrothermal synthesis.

The period for the hydrothermal synthesis is preferably 3 hours or more, more preferably 10 hours or more, from the viewpoint that the MWF backbone is formed. The period is further preferably 24 hours or more from the viewpoint of increasing the yield of the MWF-type zeolite to allow economic efficiency to be excellent.

The period is preferably 30 days or less, more preferably 20 days or less because decomposition of the organic structure-directing agent tends to be able to be suppressed. The period is further preferably 10 days or less from the viewpoint that formation of a zeolite having a backbone different from the MWF-type backbone can be suppressed.

The container to which the mixed gel is loaded in the hydrothermal synthesis step is not particularly limited as long as it is a container commonly used, and when the pressure in the container is increased at a predetermined temperature or is gas pressure not inhibiting crystallization, the mixed gel is preferably loaded in a pressure-resistant container and subjected to the hydrothermal synthesis.

The pressure-resistant container is not particularly limited, and a pressure-resistant container having any of various shapes such as spherical, longitudinally elongated, and horizontally elongated shapes can be used.

When the mixed gel in the pressure-resistant container is stirred, the pressure-resistant container is rotated vertically and/or laterally, preferably rotated vertically.

When the pressure-resistant container is rotated vertically, the rotational speed is not particularly limited as long as it is within a range commonly used, and it is preferably 1 to 50 rpm, more preferably 10 to 40 rpm.

In the hydrothermal synthesis step, examples of preferable stirring of the mixed gel include a method including using a pressure-resistant container having a longitudinally elongated shape and vertically rotating it.

[Separation/Drying Step]

After the hydrothermal synthesis step, the solid as the product and the liquid including water are separated, and the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation.

The resultant from separation may be used as it is, or may be washed with water or a predetermined solvent. The resultant from separation can be, if necessary, dried.

The temperature at which the resultant from separation is dried is not particularly limited as long as it is a common drying temperature, and it is usually from room temperature to 150° C. or less.

The atmosphere during drying is not particularly limited as long as it is an atmosphere commonly used, and an air atmosphere, or an atmosphere to which an inert gas such as nitrogen or argon, or oxygen is added is usually used.

[Calcining Step]

An MWF-type zeolite, if necessary, calcined can be used. The calcining temperature is not particularly limited as long as it is a temperature commonly used, and it is preferably 300° C. or more, more preferably 350° C. or more, from the viewpoint that, when the organic structure-directing agent is desired to be removed, the proportion thereof remaining can be decreased. The temperature is further preferably 400° C. or more from the viewpoint that the calcining period is decreased to allow the economic efficiency in zeolite production to be excellent.

The temperature is preferably less than 550° C., more preferably 530° C. or less, further preferably 500° C. or less because crystallinity of zeolite tends to be retained.

The calcining period is not particularly limited as long as it is a period where the organic structure-directing agent is sufficiently removed, and it can be appropriately selected depending on the calcining temperature and is preferably 0.5 hours or more, more preferably 1 hour or more, further preferably 3 hours or more because the proportion of the remaining organic structure-directing agent tends to be able to be decreased.

The calcining period is preferably 20 days or less, more preferably 10 days or less, further preferably 7 days or less because crystallinity of zeolite tends to be retained.

The calcining atmosphere is not particularly limited as long as it is an atmosphere commonly used, and an air atmosphere, or an atmosphere to which an inert gas such as nitrogen or argon, or oxygen is added is usually used.

[Cation Exchange]

The MWF-type zeolite can be, if necessary, subjected to cation exchange to a desired cation type. In such cation exchange, without limitation to the following, for example, nitrate such as $NH_4NO_3$, $LiNO_3$, $NaNO_3$, $KNO_3$, $RbNO_3$, $CsNO_3$, $Be(NO_3)_2$, $Ca(NO_3)_2$, $mg\ (NO_3)_2$, $Sr(NO_3)_2$ or $Ba(NO_3)_2$, or a salt where a nitrate ion included in the nitrate is changed to a halide ion, a sulfate ion, a carbonate ion, a hydrogen carbonate ion, an acetate ion, a phosphate ion or a hydrogen phosphate ion, or an acid such as nitric acid or hydrochloric acid can be used.

The cation exchange temperature is not particularly limited as long as it is a common cation exchange temperature, and it is usually from room temperature to 100° C. or less.

In separation of zeolite after such cation exchange, the separation method is not particularly limited as long as it is a common method. Filtration, decantation, a spray-drying method (rotary atomization, nozzle atomization, ultrasonic atomization or the like), a drying method using a rotary evaporator, a vacuum drying method, a freeze-drying method, a natural drying method, or the like can be used, and separation can be usually made by filtration or decantation.

The resultant from separation may be used as it is, or may be washed with water or a predetermined solvent. The resultant from separation can be, if necessary, dried.

The temperature at which the resultant from separation is dried is not particularly limited as long as it is a common drying temperature, and it is usually from room temperature to 150° C. or less.

The atmosphere during drying is not particularly limited as long as it is an atmosphere commonly used, and an air atmosphere, or an atmosphere to which an inert gas such as nitrogen or argon, or oxygen is added is usually used.

Furthermore, an ammonium-type zeolite can also be calcined and thus converted to a proton-type zeolite.

[Separation of Gas Mixture]

The MWF-type zeolite of the present embodiment can be used to thereby selectively adsorb into the MWF-type zeolite a gas component larger in the amount of adsorption into the MWF-type zeolite, among components of the gas mixture, thereby separating such a gas component. That is, the method for separating gas of the present embodiment includes a step of contacting the MWF-type zeolite of the present embodiment with a gas mixture including a plurality of gas components, to adsorb a gas component larger in the amount of adsorption into the MWF-type zeolite, thereby separating the gas component from the gas mixture.

Examples of the gas mixture include, but not limited to the following, one including at least one component selected from carbon dioxide, hydrogen, oxygen, nitrogen, methane, ethane, ethylene, propane, propylene, n-butane, isobutane, 1-butene, 2-butene, isobutene, sulfur hexafluoride, helium, carbon monoxide, nitrogen monoxide and water.

Furthermore, the gas mixture is more preferably one including at least two of the above components. In this case, such two components are preferably a combination of a component large in the amount of adsorption into the MWF-type zeolite of the present embodiment and a component small in such an amount of adsorption.

Examples of the combination of the gas mixture include, but not limited to the following, a gas mixture mainly including at least one component selected from the group consisting of carbon dioxide and water, and at least one component selected from the group consisting of oxygen, nitrogen and methane.

Although some methods, among industrial processes using zeolite as an adsorbent, are those including drying in a closed system without any regeneration step required ($SF_6$ gas drying, interlaminar drying of multiple glass, refrigerant drying or the like), zeolite is often regenerated and reused as an adsorbent.

The gas which is adsorbed into the MWF-type zeolite can be recovered by a method such as a thermal regeneration (TSA) method, a pressure regeneration (PSA) method, a pressure/temperature swing adsorption (PTSA) method, a substitution method, a purging method or a combination of such methods, depending on the difference in desorption method (regeneration system) of the component which is adsorbed into the pore of zeolite, and at the same time, the MWF-type zeolite can be regenerated. That is, a zeolite regeneration method of the present embodiment includes a step of desorbing the gas component adsorbed into the MWF-type zeolite, by the method for separating gas of the present embodiment, to regenerate the MWF-type zeolite.

The MWF-type zeolite of the present embodiment is not particularly limited in the application thereof, and can be used for, for example, separating agents for various gases and liquids, electrolyte membranes for fuel cells and the like, fillers of various resin molded articles, membrane reactors, catalysts for hydrocracking, alkylation and the like, catalyst carriers for carrying metals, metal oxides, and the like, adsorbents, desiccants, detergent aids, ion exchangers, waste water treatment agents, fertilizers, food additives, cosmetic additives, and the like.

EXAMPLES

Hereinafter, the present embodiment will be described with reference to Examples and the like in more detail, but such Examples are illustrative, and the present embodiment is not intended to be limited to the following Examples. The following Examples can be variously modified and carried out as the present embodiment by those skilled in the art, and such modifications are encompassed within the scope of the present invention as long as these can satisfy predetermined requirements of the present embodiment.

[Crystal Structure Analysis]

Crystal structure analysis was performed according to the following procedure.

(1) A dried product obtained in each of Examples and Comparative Examples was used as a sample, and pulverized by an agate mortar.

(2) The sample in (1) above was uniformly secured on a non-reflective sample plate for powder, and subjected to crystal structure analysis in the following conditions to measure the predetermined peak intensity and half-value width.

X-ray diffraction apparatus (XRD): powder X-ray diffraction apparatus "RINT2500 Model" (trade name) manufactured by Rigaku Corporation X-ray source: Cu tube (40 kV, 200 mA)

Measurement temperature: 25° C.

Measurement range: 5 to 60° (0.02°/step)

Measurement speed: 0.2°/min

Slit width (scattering, diffusion, light reception): 1°, 1°, 0.15 mm

[Gas Adsorption Isotherm Measurement]

Gas adsorption isotherm measurement was performed according to the following procedure.

(1) A calcined product obtained in each of Examples and Comparative Examples was used as a sample, and 0.2 g thereof was placed in a 12-mm cell (manufactured by Micromeritics Instrument Corporation).

(2) The sample placed in the cell of (1) above was mounted in a gas adsorption measuring apparatus "3-Flex" (trade name) manufactured by Micromeritics Instrument Corporation, and subjected to a degassing treatment with heating under vacuum at 250° C. and 0.001 mmHg or less for 12 hours.

(3) The sample placed in the cell after the treatment in (2) above was placed in constant-temperature circulating water at 25° C., and, after the sample temperature reached 25±0.2° C., measurement with liquefied carbon dioxide (produced by Sumitomo Seika Chemicals Co., Ltd., purity: 99.9% by mass or more) or methane gas (produced by Sumitomo Seika Chemicals Co., Ltd., purity: 99.9% by mass or more) was conducted with the absolute pressure being up to 0.25 to 760 mmHg. Here, the pressure was measured over time during the measurement, and it was determined that the amount of saturation adsorption was achieved when the pressure variation reached 0.001%/10 sec or less.

[Adsorption Selection Rate]

In gas adsorption isotherm measurement, when the amount of saturation adsorption of carbon dioxide into the MWF-type zeolite, measured when the MWF-type zeolite and carbon dioxide were placed in a system at 25° C. and 760 mmHg, was defined as a ($cm^3/g$) and the amount of saturation adsorption of methane into the MWF-type zeolite, measured when the MWF-type zeolite and methane were placed in a system at 25° C. and 760 mmHg, was defined as b ($cm^3/g$), the value (a/b) obtained by dividing a by b was calculated as the adsorption selection rate.

Example 1

Added and dissolved were 62.02 g of water, 0.91 g of sodium hydroxide (NaOH, produced by Wako Pure Chemical Industries, Ltd.) and 1.64 g of sodium aluminate ($NaAlO_2$, produced by Wako Pure Chemical Industries, Ltd.), thereby providing an aqueous solution. While the aqueous solution was stirred at 10° C., 10.67 g of colloidal silica (Ludox AS-40, produced by W. R. Grace & Co.—Conn.) was added thereto at a rate of 1 cc/min. After the solution was stirred at 10° C. for 1 hour, 11.15 g of tetraethylammonium bromide (produced by Tokyo Chemical Industries Co., Ltd.) as an organic structure-directing agent was added thereto and mixed, and stirred at 10° C. for 3 hours, thereby preparing a mixed gel. The composition of the mixed gel was as follows: $\alpha=SiO_2/Al_2O_3=7.1$, $\beta=Na_2O/Al_2O_3=2.1$, $\gamma=H_2O/Al_2O_3=380$, $\delta=OH^-/SiO_2=0.32$ and $\varepsilon=R/Al_2O_3=5.3$. The mixed gel was loaded to a 200-mL stainless autoclave with a fluororesin inner cylinder placed and was subjected to hydrothermal synthesis at 125° C. for 7 days with the number of rotations of vertical stirring being kept at 20 rpm, a product was subjected to filtration and dried at 120° C., and thereafter a powdered zeolite was obtained.

Figure 1:
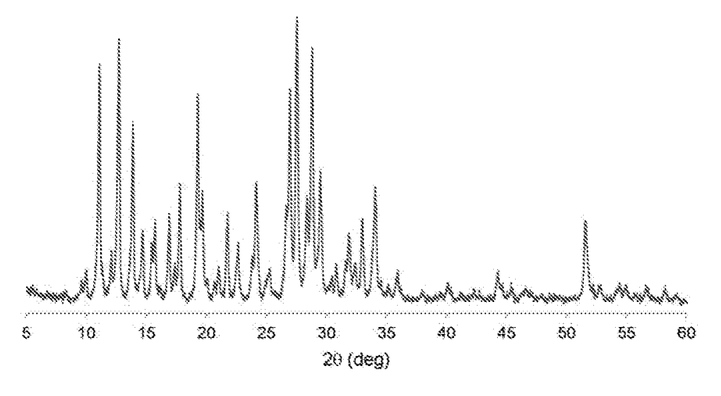
FIG. 1 illustrates an X-ray diffraction (XRD) diagram of an MWF-type zeolite obtained in Example 1.

An XRD spectrum of the resulting zeolite is illustrated in FIG. 1. It was confirmed from the spectrum that the resulting zeolite was an MWF-type zeolite. Furthermore, there were not observed any peaks derived from other zeolite, amorphous silica/alumina and the like, and therefore the resulting zeolite was evaluated to be a high-purity MWF-type zeolite. The peak intensity ratios obtained from the XRD pattern were as follows: B/A=0.79 and C/A=0.44; and the peak half-value widths obtained therefrom were as follows: A was 0.18 deg, B was 0.19 deg and C was 0.22 deg.

The adsorption isotherms of $CO_2$ and $CH_4$ into the resulting MWF-type zeolite were measured, and thus the respective amounts of adsorption at 25° C. and 760 mmHg were as follows: $CO_2$: 66.8 cm$^3$/g and $CH_4$: 0.2 cm$^3$/g; and the adsorption selection rate (a/b) was 278.

Example 2

A zeolite was synthesized in the same manner as in Example 1 except that the amount of sodium hydroxide was 0.72 g and the compositional ratios of the mixed-gel were as follows: $\beta=Na_2O/Al_2O_3=1.9$ and $\delta=OH^-/SiO_2=0.25$.

From an XRD pattern of the resulting MWF-type zeolite, B/A=0.80 and C/A=0.42 were satisfied and the peak half-value widths were as follows: A was 0.19 deg, B was 0.19 deg and C was 0.23 deg.

The adsorption isotherms of $CO_2$ and $CH_4$ into the resulting MWF-type zeolite were measured, and thus the respective amounts of adsorption at 25° C. and 760 mmHg were as follows: $CO_2$: 67.4 cm$^3$/g and $CH_4$: 0.3 cm$^3$/g; and the adsorption selection rate (a/b) was 225.

Example 3

A zeolite was synthesized in the same manner as in Example 2 except that the amount of tetraethylammonium bromide was 17.50 g and the compositional ratio of the mixed-gel was as follows: $\varepsilon=R/Al_2O_3=8.3$.

From an XRD pattern of the resulting MWF-type zeolite, B/A=0.65 and C/A=0.37 were satisfied and the peak half-value widths were as follows: A was 0.20 deg, B was 0.22 deg and C was 0.27 deg.

The adsorption isotherms of $CO_2$ and $CH_4$ into the resulting MWF-type zeolite were measured, and thus the respective amounts of adsorption at 25° C. and 760 mmHg were as follows: $CO_2$: 72.7 cm$^3$/g and $CH_4$: 0.5 cm$^3$/g; and the adsorption selection rate (a/b) was 145.

Example 4

A zeolite was synthesized in the same manner as in Example 1 except that the amount of water was 61.39 g, the amount of colloidal silica was 11.72 g and the compositional ratios of the mixed-gel were as follows: $\alpha=SiO_2/Al_2O_3=7.8$ and $\delta=OH^-/SiO_2=0.29$.

From an XRD pattern of the resulting MWF-type zeolite, B/A=0.77 and C/A=0.51 were satisfied and the peak half-value widths were as follows: A was 0.22 deg, B was 0.25 deg and C was 0.28 deg.

The adsorption isotherms of $CO_2$ and $CH_4$ into the resulting MWF-type zeolite were measured, and thus the respective amounts of adsorption at 25° C. and 760 mmHg were as follows: $CO_2$: 70.6 cm$^3$/g and $CH_4$: 0.7 cm$^3$/g; and the adsorption selection rate (a/b) was 101.

Example 5

The zeolite powder obtained in Example 1 was placed in an electric furnace (manufactured by Yamato Scientific Co., Ltd., FP410), and calcined in the air at 450° C. for 24 hours.

From an XRD pattern of the resulting MWF-type zeolite, B/A=0.65 and C/A=0.14 were satisfied and the peak half-value widths were as follows: A was 0.26 deg, B was 0.28 deg and C was 0.52 deg.

The adsorption isotherms of $CO_2$ and $CH_4$ into the resulting MWF-type zeolite were measured, and thus the respective amounts of adsorption at 25° C. and 760 mmHg were as follows: $CO_2$: 43.5 cm$^3$/g and $CH_4$: 0.5 cm$^3$/g; and the adsorption selection rate (a/b) was 89.

Comparative Example 1

A mixture of 20.00 g of water, 1.52 g of sodium hydroxide (NaOH, produced by Wako Pure Chemical Industries, Ltd.) and 11.15 g of tetraethylammonium bromide (produced by Tokyo Chemical Industries Co., Ltd.) as an organic structure-directing agent, and a mixture of 42.00 g of water, 1.94 g of aluminum hydroxide (Al(OH)$_3$, produced by Sigma-Aldrich) and 10.67 g of colloidal silica (Ludox AS-40, produced by W. R. Grace & Co.—Conn.) were mixed, and stirred at 28° C. for 24 hours, thereby preparing a mixed gel. The composition of the mixed gel was as follows: $\alpha=SiO_2/Al_2O_3=7.1$, $\beta=Na_2O/Al_2O_3=1.9$, $\gamma=H_2O/Al_2O_3=380$, $\delta=OH^-/SiO_2=0.54$ and $\varepsilon=R/Al_2O_3=5.3$. The mixed gel was subjected to hydrothermal synthesis at 125° C. for 7 days with stirring, a product was subjected to filtration and dried at 120° C., and thereafter a powdered zeolite was obtained.

From an XRD pattern of the resulting MWF-type zeolite, B/A=0.56 and C/A=0.30 were satisfied and the peak half-value widths were as follows: A was 0.21 deg, B was 0.22 deg and C was 0.42 deg.

The adsorption isotherms of $CO_2$ and $CH_4$ into the resulting MWF-type zeolite were measured, and thus the respective amounts of adsorption at 25° C. and 760 mmHg were as follows: $CO_2$: 78.4 cm$^3$/g and $CH_4$: 3.6 cm$^3$/g; and the adsorption selection rate (a/b) was 22.

Comparative Example 2

Added and dissolved were 69.76 g of water, 0.85 g of sodium hydroxide (NaOH, produced by Wako Pure Chemical Industries, Ltd.) and 1.64 g of sodium aluminate (NaAlO$_2$, produced by Wako Pure Chemical Industries, Ltd.), thereby providing an aqueous solution. While the aqueous solution was stirred at 28° C., 13.53 g of colloidal silica (Ludox AS-40, produced by W. R. Grace & Co.—Conn.) was added thereto at a rate of 1 cc/min. After the solution was stirred at 28° C. for 1 hour, 39.36 g of tetraethylammonium bromide (produced by Tokyo Chemical Industries Co., Ltd.) as an organic structure-directing agent was added thereto and mixed, and stirred at 28° C. for 3 hours, thereby preparing a mixed gel. The composition of the mixed gel was as follows: $\alpha=SiO_2/Al_2O_3=9.0$, $\beta=Na_2O/Al_2O_3=3.1$, $\gamma=H_2O/Al_2O_3=428$, $\delta=OH^-/SiO_2=0.47$ and $\varepsilon=R/Al_2O_3=18.7$. The mixed gel was subjected to hydrothermal synthesis at 125° C. for 7 days with stirring, a product was subjected to filtration and dried at 120° C., and thereafter a powdered zeolite was obtained.

From an XRD pattern of the resulting MWF-type zeolite, B/A=0.88 and C/A=0.55 were satisfied and the peak half-value widths were as follows: A was 0.45 deg, B was 0.36 deg and C was 0.63 deg.

The adsorption isotherms of $CO_2$ and $CH_4$ into the resulting MWF-type zeolite were measured, and thus the respective amounts of adsorption at 25° C. and 760 mmHg were as follows: $CO_2$: 65.3 cm$^3$/g and $CH_4$: 6.5 cm$^3$/g; and the adsorption selection rate (a/b) was 10.

Comparative Example 3

A zeolite was synthesized in the same manner as in Example 1 except that the preparation temperature of the mixed gel was 50° C.

From an XRD pattern of the resulting MWF-type zeolite, B/A=0.86 and C/A=0.59 were satisfied and the peak half-value widths were as follows: A was 0.28 deg, B was 0.24 deg and C was 0.30 deg.

The adsorption isotherms of $CO_2$ and $CH_4$ into the resulting MWF-type zeolite were measured, and thus the respective amounts of adsorption at 25° C. and 760 mmHg were as follows: $CO_2$: 70.0 cm$^3$/g and $CH_4$: 4.9 cm$^3$/g; and the adsorption selection rate (a/b) was 14.

Comparative Example 4

A zeolite was synthesized in the same manner as in Example 1 except that the order of addition of starting materials was as follow: colloidal silica (Ludox AS-40, produced by W. R. Grace & Co.—Conn.) and sodium hydroxide (NaOH, produced by Wako Pure Chemical Industries, Ltd.) were added to a solution where water, sodium aluminate (NaAlO$_2$, produced by Wako Pure Chemical Industries, Ltd.) and tetrabutylammonium bromide (produced by Tokyo Chemical Industries Co., Ltd.) were mixed.

From an XRD pattern of the resulting MWF-type zeolite, B/A=0.60 and C/A=0.34 were satisfied and the peak half-value widths were as follows: A was 0.20 deg, B was 0.21 deg and C was 0.24 deg.

The adsorption isotherms of $CO_2$ and $CH_4$ into the resulting MWF-type zeolite were measured, and thus the respective amounts of adsorption at 25° C. and 760 mmHg were as follows: $CO_2$: 9.2 cm$^3$/g and $CH_4$: 1.6 cm$^3$/g; and the adsorption selection rate (a/b) was 6.

TABLE 1

| No. | Composition ratio of starting materials | | | | | Preparation temperature of mixed gel (° C.) | Peak intensity ratio | | Half-value width (deg.) | | | Gas adsorption isotherm measurement | | Adsorption selection rate |
|---|---|---|---|---|---|---|---|---|---|---|---|---|---|---|
| | α | β | γ | δ | ε | | B/A | C/A | A | B | C | Amount of adsorption of $CO_2$ (cm$^3$/g) | Amount of adsorption of $CH_4$ (cm$^3$/g) | |
| Example 1 | 7.1 | 2.1 | 380 | 0.32 | 5.3 | 10 | 0.79 | 0.44 | 0.18 | 0.19 | 0.22 | 66.8 | 0.2 | 278 |
| Example 2 | 7.1 | 1.9 | 380 | 0.25 | 5.3 | 10 | 0.80 | 0.42 | 0.19 | 0.19 | 0.23 | 67.4 | 0.3 | 225 |
| Example 3 | 7.1 | 1.9 | 380 | 0.25 | 8.3 | 10 | 0.65 | 0.37 | 0.20 | 0.22 | 0.27 | 72.7 | 0.5 | 145 |
| Example 4 | 7.8 | 2.1 | 380 | 0.29 | 5.3 | 10 | 0.77 | 0.51 | 0.22 | 0.25 | 0.28 | 70.6 | 0.7 | 101 |
| Example 5 | 7.1 | 2.1 | 380 | 0.32 | 5.3 | 10 | 0.65 | 0.14 | 0.26 | 0.28 | 0.52 | 43.5 | 0.5 | 89 |
| Comparative Example 1 | 7.1 | 1.9 | 380 | 0.54 | 5.3 | 28 | 0.56 | 0.30 | 0.21 | 0.22 | 0.42 | 78.4 | 3.6 | 22 |
| Comparative Example 2 | 9.0 | 3.1 | 428 | 0.47 | 18.7 | 28 | 0.88 | 0.55 | 0.45 | 0.36 | 0.63 | 65.3 | 6.5 | 10 |
| Comparative Example 3 | 7.1 | 2.1 | 380 | 0.32 | 5.3 | 50 | 0.86 | 0.59 | 0.28 | 0.24 | 0.30 | 70.0 | 4.9 | 14 |
| Comparative Example 4 | 7.1 | 2.1 | 380 | 0.32 | 5.3 | 10 | 0.60 | 0.34 | 0.20 | 0.21 | 0.24 | 9.2 | 1.6 | 6 |

In Table 1, α to ε represent the following molar ratios.

$\alpha=SiO_2/Al_2O_3$, $\beta=(M1_2O+M2O)/Al_2O_3$, $\gamma=H_2O/Al_2O_3$, $\delta=OH^-/SiO_2$, $\varepsilon=R/Al_2O_3$ (R represents the organic structure-directing agent.)

In addition, B/A and C/A in Table 1 are determined as follows.

$B/A$=(Peak intensity around 2θ=13.8°)/(Peak intensity around 2θ=11.1°)

$C/A$=(Peak intensity around 2θ=51.6°)/(Peak intensity around 2θ=11.1°)

INDUSTRIAL APPLICABILITY

The MWF-type zeolite according to the present invention has industrial applicability to separating agents for various gases and liquids, electrolyte membranes for fuel cells and the like, fillers of various resin molded articles, membrane reactors, catalysts for hydrocracking, alkylation and the like, catalyst carriers for carrying metals, metal oxides, and the like, adsorbents, desiccants, detergent aids, ion exchangers, waste water treatment agents, fertilizers, food additives, cosmetic additives, and the like.

The invention claimed is:

1. An MWF-type zeolite, wherein, when heights of peaks around $2\theta=11.1$ and $13.8°$ in a peak obtained by X-ray diffraction are defined as A and B, respectively, $0.63 \leq B/A \leq 0.80$ is satisfied.

2. The MWF-type zeolite according to claim 1, wherein, when a height of a peak around $2\theta=51.6°$ in the peak obtained by X-ray diffraction is defined as C, $0.36 \leq C/A \leq 0.52$ is satisfied.

3. The MWF-type zeolite according to claim 1, wherein a half-value width of a peak around $2\theta=11.1°$ in the peak obtained by X-ray diffraction satisfies 0.31 or less.

4. An MWF-type zeolite, wherein, when:
an amount of saturation adsorption of carbon dioxide into the MWF-type zeolite, measured when the MWF-type zeolite and carbon dioxide are placed in a system at 25° C. and 760 mmHg, is defined as a ($cm^3/g$), and
an amount of saturation adsorption of methane into the MWF-type zeolite, measured when the MWF-type zeolite and methane are placed in a system at 25° C. and 760 mmHg, is defined as b ($cm^3/g$);
a value obtained by dividing a by b is 23 or more.

5. An MWF-type zeolite, wherein
an amount of saturation adsorption of carbon dioxide into the MWF-type zeolite, measured when the MWF-type zeolite and carbon dioxide are placed in a system at 25° C. and 760 mmHg, is 10 $cm^3/g$ or more, and
an amount of saturation adsorption of methane into the MWF-type zeolite, measured when the MWF-type zeolite and methane are placed in a system at 25° C. and 760 mmHg, is 3.5 $cm^3/g$ or less.

6. A method for producing the MWF-type zeolite according to claim 1, comprising:
a step of preparing a mixed gel comprising:
a silica source comprising silicon;
an aluminum source comprising aluminum;
an alkali metal source comprising at least one selected from an alkali metal (M1) and an alkali earth metal (M2); and
water,
wherein, when molar ratios of respective components in the mixed gel are calculated, molar ratios $\alpha$, $\beta$, $\gamma$ and $\delta$ represented by the following expressions (1), (2), (3) and (4) satisfy $5.0 \leq \alpha \leq 12$, $1.3 \leq \beta \leq 3.2$, $100 \leq \gamma \leq 3000$ and $0.10 \leq \delta \leq 0.60$:

$$\alpha = SiO_2/Al_2O_3 \quad (1)$$

$$\beta = (M1_2O + M2O)/Al_2O_3 \quad (2)$$

$$\gamma = H_2O/Al_2O_3 \quad (3)$$

$$\delta = OH^-/SiO_2 \quad (4),$$

wherein, with respect to the silicon, the aluminum, the alkali metal (M1) and the alkali earth metal (M2), the molar ratios are calculated in terms of oxides of corresponding elements.

7. The method for producing the MWF-type zeolite according to claim 6, wherein
the mixed gel further comprises an organic structure-directing agent R, and
a molar ratio $\varepsilon$ represented by the following expression (5) satisfies $2.00 \leq \varepsilon \leq 50$:

$$\varepsilon = R/Al_2O_3 \quad (5).$$

8. The method for producing the MWF-type zeolite according to claim 6, further comprising a hydrothermal synthesis step in which a hydrothermal synthesis temperature is 100° C. to 170° C.

9. The method for producing the MWF-type zeolite according to claim 6, further comprising a calcining step in which a calcining temperature is 300° C. or more and less than 550° C.

10. A method for separating gas comprising:
a step of contacting the MWF-type zeolite according to claim 1 with a gas mixture comprising a plurality of gas components, to adsorb into the MWF-type zeolite a gas component larger in an amount of adsorption into the MWF-type zeolite, thereby separating the gas component from the gas mixture.

11. The method for separating gas according to claim 10, wherein the gas mixture comprises at least two gas components selected from the group consisting of carbon dioxide, hydrogen, oxygen, nitrogen, methane, ethane, ethylene, propane, propylene, n-butane, isobutane, 1-butene, 2-butene, isobutene, sulfur hexafluoride, helium, carbon monoxide, nitrogen monoxide and water.

12. A method for regenerating the MWF-type zeolite, comprising:
a step in which the gas component adsorbed into the MWF-type zeolite by the method for separating gas according to claim 10 is desorbed to thereby regenerate the MWF-type zeolite.

* * * * *